Dec. 30, 1958 — R. J. SUTTON — 2,866,742
CATHODICALLY PROTECTED WATER STORAGE TANKS
Filed June 29, 1956 — 2 Sheets-Sheet 1

INVENTOR.
Robert J. Sutton
BY
Smith, Olsen, Baird & Miller,
Attys.

Dec. 30, 1958  R. J. SUTTON  2,866,742
CATHODICALLY PROTECTED WATER STORAGE TANKS
Filed June 29, 1956
2 Sheets-Sheet 2

INVENTOR
Robert J. Sutton

Smith, Olsen, Baird & Miller
Attys.

United States Patent Office 2,866,742
Patented Dec. 30, 1958

2,866,742

CATHODICALLY PROTECTED WATER STORAGE TANKS

Robert J. Sutton, Chicago, Ill., assignor to General Electric Company, a corporation of New York Application June 29, 1956, Serial No. 594,859

7 Claims. (Cl. 204—197)

The present invention relates to water storage tanks, and more particularly, to such tanks especially designed for use in water heaters, or the like.

It is a general object of the invention to provide a water storage tank that incorporates an improved liner arrangement that resists the corrosive attack of water containing such common corrosive agents as $CO_2$, $O_2$, $Cl^-$, $SO_4^{--}$, etc., in the pH range below about 9.0.

Another object of the invention is to provide a water storage tank that comprises a hollow body formed of steel, a primary liner formed of zinc and intimately bonded to the interior surface of the body, and a secondary liner formed of hydraulic cement and arranged in contact and in covering relation with only a portion of the interior surface of the primary liner.

A further object of the invention is to provide a water storage tank of the character described, wherein the hydraulic cement of the secondary liner essentially comprises oxides of silicon and alkali earth metals, so that the secondary liner supplies small amounts of alkali earth metal cations to the water stored in the body.

A further object of the invention is to provide a water storage tank of the character described, wherein the area of the primary liner is commensurate with that of the body and has a thickness of only several mils, and wherein the area of the secondary liner is commensurate with only a major portion of that of the primary liner and has a thickness only in the general range 125 to 250 mils, whereby the water storage tank is given effective corrosive protection with minimum amounts of materials in the respective primary and secondary liners.

A still further object of the invention is to provide a water storage tank of the character described, wherein the thermal mass of the secondary liner formed of concrete is commensurate with that of the body formed of steel, whereby the water storage tank is especially adapted for use in a water heater, or the like.

Further features of the invention pertain to the particular arrangement of the elements of the water storage tank, whereby the above-outlined and additional operating features thereof are attained.

The invention, both as to its organization and method of operation, together with further objects and advantages thereof, will best be understood by reference to the following specification taken in connection with the accompanying drawings, in which.

Figure 1:
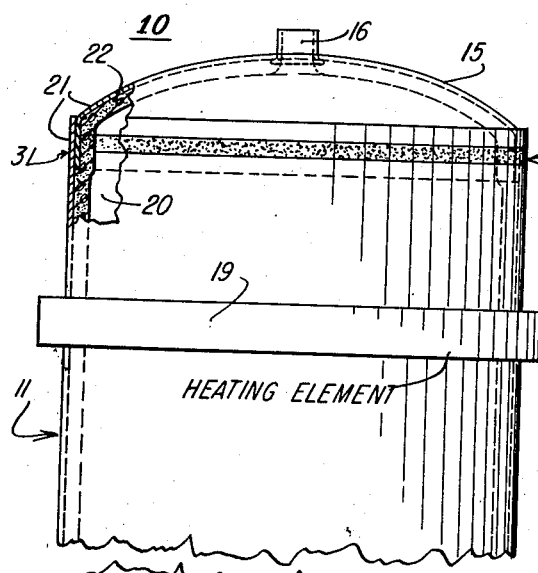
Figure 1 is a side elevational view, partly broken away, of the water storage tank incorporated in an electric water heater and embodying the present invention.

Referring now to Fig. 1 of the drawings, there is illustrated the water storage tank 10 of an electric water heater and embodying the features of the present invention. The tank 10 comprises an upstanding body 11 formed of steel and including a tubular side wall 12, a bottom header 13 carrying a threaded water inlet spud 14, and a top header 15 carrying a threaded water outlet spud 16. Also the bottom header 13 carries an inlet water diffuser structure 17 disposed in the lower portion of the body 11 for the usual purpose of preventing mixing of the cold incoming water and the hot stored water in the tank 10. Also the exterior surface of the body 12 carries lower and upper electric heating elements 18 and 19 that are of the wrap-around type and that may be of the construction disclosed in U. S. Patent No. 2,452,214, granted on October 26, 1948, to Oliver G. Vogel and Francis E. Kirk.

Figure 2:
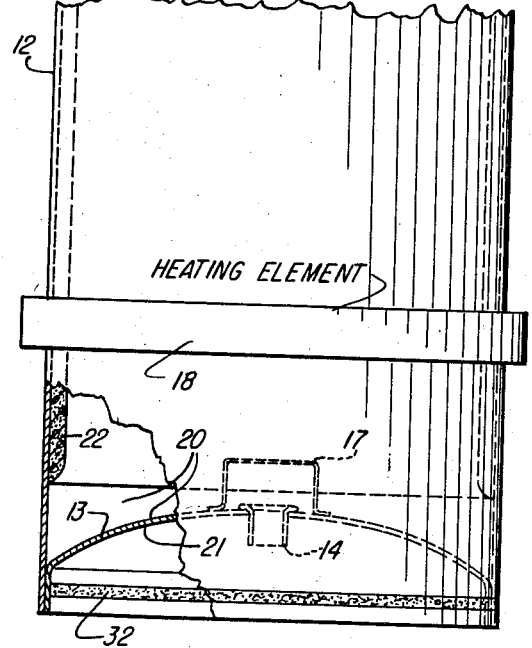
Fig. 2 is a greatly enlarged fragmentary vertical sectional view of the upper portion of the water storage tank, illustrating the construction thereof at the junction between the upper end of the tubular side wall and the top header.
Figure 2:
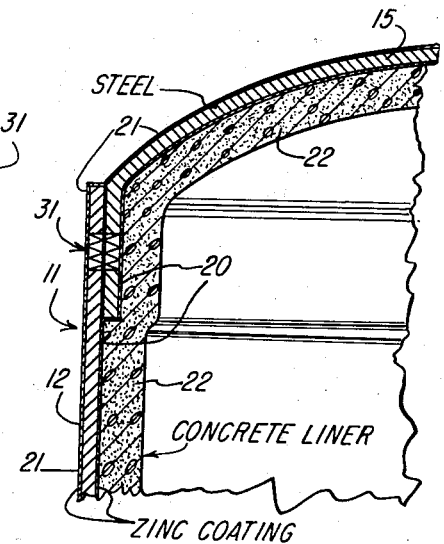
Figure 3:
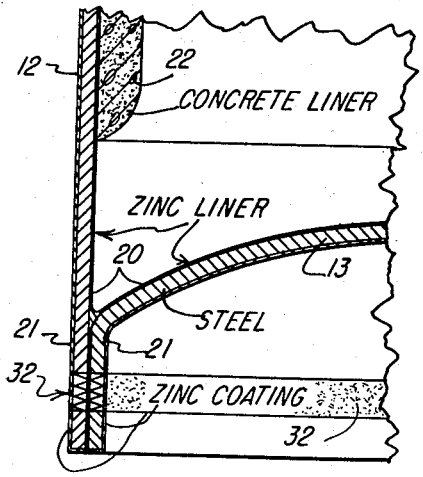
Fig. 3 is a greatly enlarged fragmentary vertical sectional view of the lower portion of the water storage tank, illustrating the construction thereof at the junction between the lower end of the tubular side wall and the bottom header.

As best illustrated in Figs. 2 and 3, the interior surfaces of the tubular side wall 12, the bottom header 13 and the top header 15 are provided with a continuous primary liner 20 formed of zinc, and a substantially continuous outer coating 21 formed of zinc; and preferably the primary liner 20 and the outer coating 21 are formed by hot dip galvanizing, as explained more fully below. Also the interior surfaces of the primary liner 20 carry a continuous secondary liner 22 formed of concrete. In the arrangement, the primary liner 20 is intimately bonded to the interior surfaces of the tubular side wall 12, the bottom header 13 and the top header 15 and commensurate in area therewith, whereby these interior surfaces are completely covered by the primary liner 20. The secondary liner 22 is bonded to the interior surfaces of the primary liner 20 overlying the upper portion of the tubular side wall 12 and the top header 15 and commensurate in area therewith; whereby only these interior surfaces of the primary liner 20 are covered by the secondary liner 22. Accordingly, a major portion of the interior surfaces of the primary liner 20 is covered by the secondary liner 22, leaving uncovered a minor portion of the interior surfaces of the primary liner 20 overlying the lower portion of the tubular side wall 12, and the bottom header 13, as explained more fully below.

In the arrangement, the primary linear 20 has a thickness of only several mils, corresponding to a weight of zinc of about 2 oz./ft.², while the secondary linear 22 has a thickness in the general range 125 to 250 mils. Further, the steel plate of the body 11 may have a thickness of about 125 mils.

The secondary liner 22 is formed of concrete, as previously noted, and may comprise a 2:1 mix of a suitable aggregate—for example, crushed limestone—and hydraulic cement. Preferably the hydraulic cement comprises a suitable Portland cement, i. e. Atlas. A Portland cement of this character may have the following approximate composition by weight:

| | Percent |
|---|---|
| CaO | 58 to 67 |
| $SiO_2$ | 19 to 26 |
| $Al_2O_3$ | 4 to 11 |
| $Fe_2O_3$ | 2 to 5 |
| MgO | 0 to 5 |
| $SO_3$ | 0 to 2.5 |
| $Na_2O, K_2O$ | 0 to 3 |

When a Portland cement of this character sets up, the concrete essentially comprises the hydrated products of compounds formed from the oxides named, and particularly the compounds $Ca_2Si_4$, $Ca_3SiO_5$ and $Ca_3(AlO_3)_2$. In the setting up action, the tricalcium silicate appears to be especially important, as it forms gelatinous hydrates which gradually harden and cement the crystals together.

Turning now to a method of making the tank 10: the individual steel elements comprising the tubular side wall 12, the bottom header 13 and the top header 15 are first formed; the water inlet spud 14 is suitably welded into the central opening provided in the bottom header 13; the water diffusion structure 17 is suitably welded to the interior surface of the bottom header 13; and the water outlet spud 16 is suitably welded into the central opening provided in the top header 15. The top header 15 is then pressed in a convex position into the upper end of the tubular side wall 12 and welded in place by electric seam welding, as indicated at 31 in Fig. 2. The top subassembly, including the tubular side wall 12, the top header 15 and the spud 16, is then galvanized to produce the corresponding portions of the primary liner 20 and the outer coating 21; and likewise, the bottom sub-assembly, including the bottom header 13, the spud 14 and the diffusion structure 17, is then galvanized to produce the corresponding portions of the primary liner 20 and the outer coating 21. In these operations, hot-dip galvanizing is recommended. Next, the secondary liner 22 is applied within the top subassembly; and conveniently the top subassembly may be rotated in an inverted position in a spinning machine and the required amount of concrete mix is poured or sprayed thereinto so that the secondary liner 22 is formed and distributed, as desired, by the rotation of the subassembly. After the configuration of the secondary liner 22 is thus established, but before the concrete thereof has completely set-up, the top subassembly is removed from the spinning machine, and the lower portion of the interior surface of the primary liner 20 is cleaned in any suitable manner so as to remove therefrom any concrete that may be deposited thereon. When the concrete of the secondary liner 22 has thoroughly set, the bottom subassembly is pressed in a concave position into the lower end of the tubular side wall 12 and welded in place by electric seam welding, as indicated at 32 in Fig. 3. In this welding step, the heat developed effects fusion of the cooperating engaging portions of the primary liner 20, so that upon cooling and resolidification the primary liner 20 is entirely continuous; and likewise, the heat developed effects fusion of the cooperating engaging portions of the outer coating 21, so that upon cooling and resolidification the outer coating 21 is substantially continuous.

In the manufacture of a water heater utilizing the finished tank 10, the electric heating elements 18 and 19 are applied and secured in place; and ultimately this assembly is arranged in a heat-insulating jacket or casing, not shown.

In the use of the tank 10: the area of the secondary linear 22 that is in contact with the water stored therein is materially greater than the area of the primary liner 20 in contact with the water stored therein; the secondary liner 22 supplies small amounts of alkali earth metal cations to the stored water tending to increase the pH thereof; and the secondary liner 22 is rendered anodic, while the primary liner 20 and the body 11 are rendered cathodic, when water is stored therein. Accordingly, the arrangement, when the primary liner 20 and the secondary liner 22 is very advantageous to protect the steel body 11 against the corrosive attack of stored water containing corrosive agents characteristic of city water in many soft-water areas, notwithstanding the facts that the primary zinc liner 20 has a thickness of only several mils, and the secondary concrete liner 22 has a thickness less than about ¼". Specifically, in this connection, it is noted that the protection that is afforded to the steel body 11 is greatly in excess of that provided by the relatively thin primary zinc liner 20 and the protection afforded the primary liner 20 is greatly in excess of that provided by the relatively thin concrete liner 22; which composite protection is brought about by the electrolytic or galvanic phenomena previously mentioned, by virtue of the fact that the composite arrangement renders cathodic the steel body 11 and the primary zinc liner 20.

Also, it is mentioned that the arrangement of the tank 10 in a water heater is very advantageous by virtue of the circumstance that the heat-storage capacity of the concrete liner 22 is commensurate with that of the steel body 11; whereby the thermal mass of the tank 10 is substantially twice that of a conventional water storage tank; which arrangement minimizes cooling of the mass of stored hot water incident to a draw-off of hot water for use.

Figure 4:
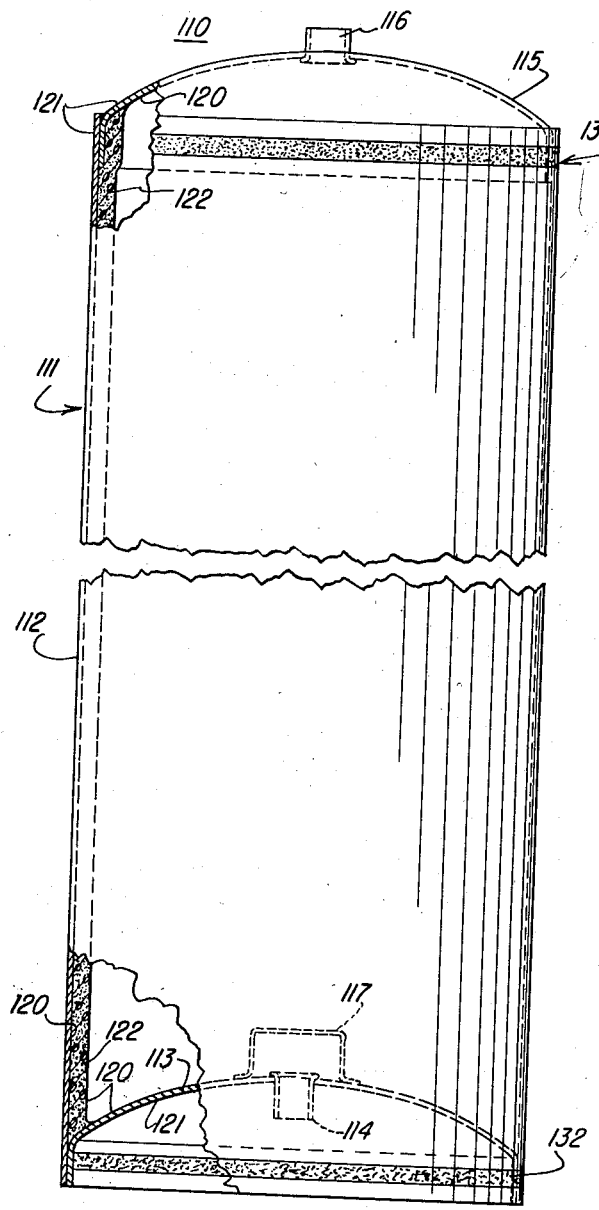
Fig. 4 is a side elevational view, partly broken away, of a modified form of the water storage tank.

Referring now to Fig. 4, a modified form of the water storage tank 110 is illustrated and embodying the features of the present invention. The tank 110 is fundamentally of the same construction as the tank 10, previously described, and including the corresponding elements 111, 112, 113, etc. However, in this construction, the secondary concrete liner 122 is bonded to the interior surfaces of the primary zinc liner 120 overlying the tubular side wall 112 and the adjacent peripheral portions of the bottom header 113 and the top header 115 and commensurate in area therewith; whereby only these interior surfaces of the primary liner 120 are covered by the secondary liner 122.

Turning now to a method of making the tank 110: the top subassembly and the bottom subassembly are produced and secured together to provide a composite container, in the manner previously explained, prior to the application of the secondary concrete liner 122. At this time, the secondary liner 122 is applied within the completed tank 110; and conveniently the completed tank may be rotated in a substantially horizontal position in a spinning machine and the required amount of concrete mix is poured or sprayed thereinto through the spud 116 so that the secondary liner 122 is formed and distributed, as desired, by the rotation of the tank 110. After the secondary concrete liner 122 has been distributed and set-up, the finished tank 110 may be removed from the spinning machine.

The overall advantages and utility of the tank 110 are the same as described in conjunction with the tank 10.

In view of the foregoing, it is apparent that there has been provided in a steel water storage tank an improved primary-secondary liner arrangement that affords a maximum protection against attack by water containing corrosive components, while utilizing substantially minimum quantity of protective materials employed in the respective primary and secondary liners employed in the arrangement.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A water storage tank comprising a hollow body formed of steel and including a tubular side wall and a pair of opposed end walls, a primary liner formed of zinc and intimately bonded to the interior surfaces of said side wall and said end walls, said primary liner being continuous and commensurate with the interior surfaces of said side wall and said end walls completely to cover the same, and a secondary liner in contact with the interior surface of said primary liner and formed of concrete, said secondary liner covering the major area of the interior surface of said primary liner and leaving uncovered the minor area of the interior surface of said primary liner, said uncovered minor area being at least substantially commensurate with the inside area of one of said end walls, said secondary liner supplying small amounts of alkali earth metal cations to the water stored in said body, and the area of said secondary liner in contact with the water stored in said body being materially greater than the area of said primary liner in contact with the water stored in said body.

2. The water storage tank set forth in claim 1, wherein said primary liner has a thickness of only several mils, and said secondary liner has a thickness in the range 125 to 250 mils.

3. The water storage tank set forth in claim 1, wherein said concrete includes an aggregate of crushed limestone.

4. The water storage tank set forth in claim 1, wherein said concrete essentially comprises a 2:1 mix of crushed aggregate and Portland cement.

5. The water storage tank set forth in claim 1, wherein said secondary liner has a heat storage capacity commensurate with that of said body in order substantially to increase the thermal mass of said tank.

6. A water storage tank comprising a hollow body formed of steel and including a tubular side wall and a pair of opposed end walls, a primary liner formed of zinc and intimately bonded to the interior surfaces of said side wall and said end walls, said primary liner being continuous and commensurate with the interior surfaces of said side wall and said end walls completely to cover the same, and a secondary liner formed of concrete and in contact with the interior surfaces of said primer liner overlying one of said end walls and overlying a major portion of said side wall, the interior surfaces of said primary liner overlying the other of said end walls and overlying a minor portion of said side wall being uncovered by said secondary liner, said secondary liner supplying small amounts of alkali earth metal cations to the water stored in said body, and the area of said secondary liner in contact with the water stored in said body being materially greater than the area of said primary liner in contact with the water stored in said body.

7. The water storage tank set forth in claim 6, wherein said tank is normally arranged in an upstanding position and it is the interior surfaces of said primary liner overlying the bottom end wall and the lower portion of said side wall that are uncovered by said secondary liner.

References Cited in the file of this patent

UNITED STATES PATENTS

| | | |
|---|---|---|
| 1,811,160 | Stevenson | June 23, 1931 |
| 1,855,077 | Wildt | Apr. 19, 1932 |
| 2,428,526 | Osterheld | Oct. 7, 1947 |

OTHER REFERENCES

Evans: Metallic Corrosion, Passivity and Protection, London, Edward Arnold & Co., 1948, pp. 171, 328 and 329.